US005471728A

United States Patent [19]

Feese et al.

[11] Patent Number: 5,471,728

[45] Date of Patent: Dec. 5, 1995

[54] FUEL LINE DISCONNECT TOOL

[76] Inventors: Emerson L. Feese, 23 Tina St., Cleburne, Tex. 76031; Joel A. Negus, 323 E. Nishna, Clarinda, Iowa 51632

[21] Appl. No.: 280,313

[22] Filed: Jul. 26, 1994

[51] Int. Cl.[6] .................. F16L 35/00

[52] U.S. Cl. .................. 29/237; 294/99.2

[58] Field of Search .................. 294/99.2, 11, 99.1, 294/33; 29/237, 272, 235, 268

[56] References Cited

U.S. PATENT DOCUMENTS

| | | | |
|---|---|---|---|
| 1,634,856 | 7/1927 | Skroch | 294/99.2 |
| 1,789,524 | 1/1931 | Hall | 294/99.2 |
| 2,579,207 | 12/1951 | Scheib | 294/99.2 |
| 3,215,006 | 11/1965 | Urani | 294/99.2 |
| 5,084,954 | 2/1992 | Klinger | 29/237 |

OTHER PUBLICATIONS

Owattana Tool Company, Model No. 7660, Fuel Line Disconnect Tool, p. B–8 (Date Unknown).

Owattana Tool Company, Model No. J39504, GM Fuel Line Disconnect Tool Set, p. B–8 (Date Unknown).

Owattana Tool Company, Model No. 7337, Ford Fuel Line Disconnect Tool Set, p. B–8 (Date Unknown).

Owattana Tool Company, Model No. 7361, Fuel Line Disconnect Tool Set, p. B–8, (Date Unknown).

Owattana Tool Company, Model No. 7363, Fuel Line Disconnect Tool Set, p. B–8, (Date Unknown).

K–D Tools®, Model No. 3290, Ford A/C and Fuel Line Spring Lock Coupling Tool, p. 59, (Date Unknown).

*Primary Examiner*—Robert C. Watson

*Attorney, Agent, or Firm*—Banner & Allegretti, Ltd.

[57] ABSTRACT

A semi-cylindrical tool for decoupling telescoping tubular members includes two companion, opposed semi-cylindrical engaging sections each joined to an elongated arm which, in turn, is attached to a single handle. The elongated arms are flexible and permit access of the tool into difficult to reach places.

2 Claims, 3 Drawing Sheets

FIG. 2
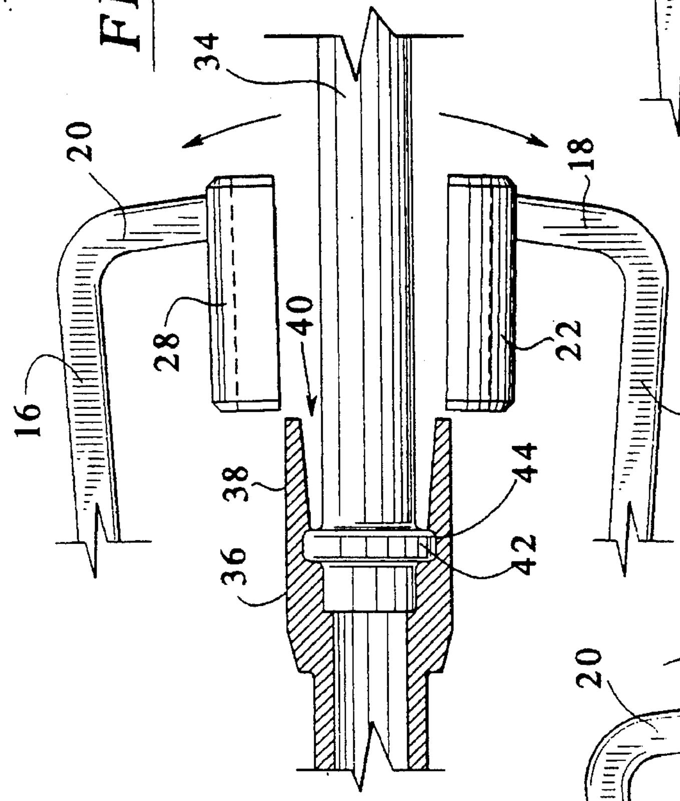
FIG. 4
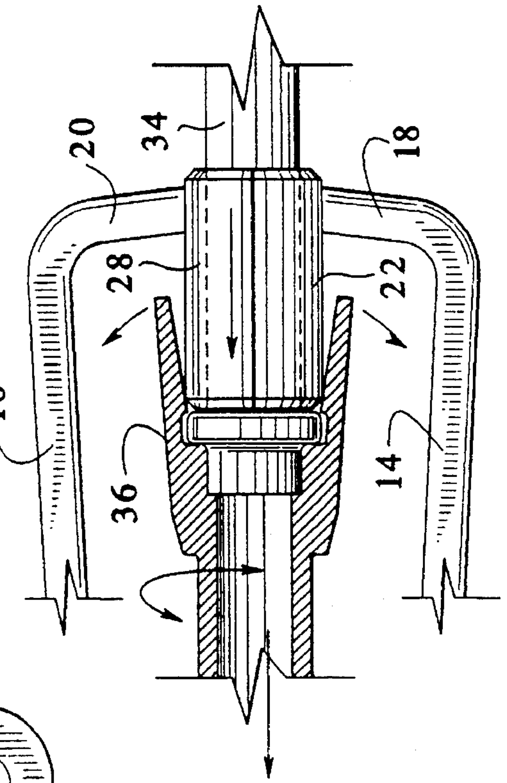
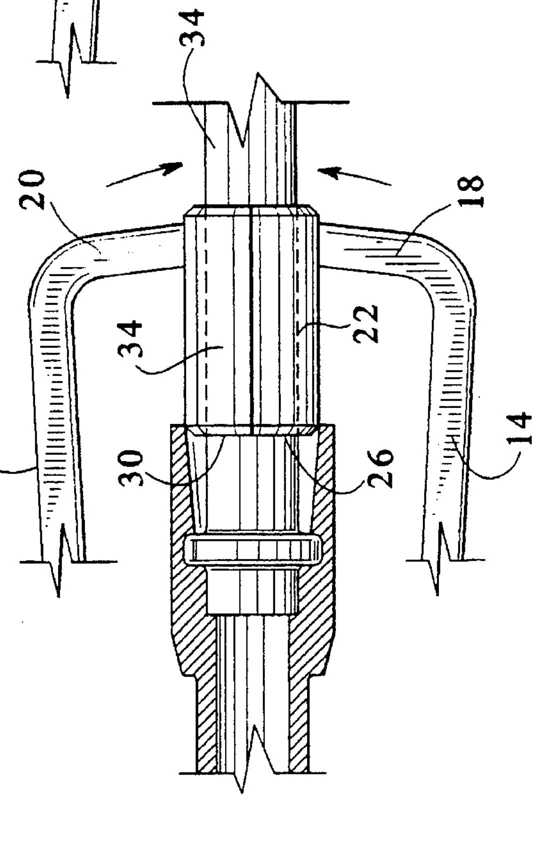
FIG. 3

FUEL LINE DISCONNECT TOOL

BACKGROUND OF THE INVENTION

This invention relates to a tool useful for disengaging couplings of the type recently introduced in the automotive industry that connect fuel lines for a vehicle fuel tank, for example.

The American automotive industry recently introduced quick connect tubular couplings typically used to connect tubes leading to and from various automotive components such as radiators, pumps, fuel tanks and the like. Such couplings may also be useful for other purposes including with appliances, air conditioners, machine tools, and the like. A version of a quick connect, tubular coupling construction is disclosed in U.S. Pat. No. 4,055,359 which is incorporated herewith by reference. The referenced patent discloses a larger diameter tube adapted to slidably or telescopically receive a smaller diameter tube. O-ring seals are provided between the tubes. The distal end of the larger diameter tube has an upwardly and outwardly flaring flange which is received in a slot defined in an annular cage mounted on the outside circumferential surface of the smaller diameter tube. A circular, compression spring is retained in the cage and fits over and engages the flange of the larger diameter tube to retain the tubes in a locked condition.

U.S. Pat. No. 4,055,359 also discloses a tool which is useful for disconnecting the quick connect tubular couplings. That tool includes a cylindrical body with an annular portion that fits through the slot in the cage mounted on the smaller diameter tube so as to engage the circular spring and thereby remove the spring from locking engagement with the flange on the larger diameter tube. Other tool manufacturers have developed similar tools for disconnecting such couplings. For example, Owatona Tool Company, sells a disconnect tool kit, Product No. 7363, which appears to be substantially similar to the tool disclosed in the '359 patent. Owatona also sells alternative disconnect tools, product No. 7335, No. 7336 and No. 7361. Owatona product Nos. 7335 and 7336 consist of a spring decoupling tool having two plastic shells held together by a pivot pin and a biasing spring. Product No. 7361 comprises a unitary molded cylinder which has a living spring on one side that allows the two half sections of the tool to slip over the lines being disconnected. Yet a third style, Owatona product No. 7244, is totally machined from metal.

These tools are very useful in situations where the coupling is easily accessible. However, in numerous situations, the coupling is not very accessible. For example, in 1992 and later model Ford pick-up trucks, the fuel line to the fuel tank is in a generally difficult position to reach with tools of the type described above. Thus, when repairing the fuel pump or inserting a filter in the fuel line it may be necessary to remove the fuel tank. Removing the fuel tank before decoupling the fuel line may result in damage to the tank, line or fuel pump. Thus, there has developed a need to devise a tool to facilitate decoupling of couplings of the general type described which are located in generally inaccessible places.

SUMMARY OF THE INVENTION

Briefly, the present invention comprises an improved tool for decoupling or disconnecting a first larger diameter tube or tube end from a second smaller diameter tube wherein the smaller tube is inserted or telescoped into the larger tube and the tubes retained together by an annular member retained by one of the tubes and simultaneously engaged with the other tube. The disconnect tool includes first and second, opposed semi-cylindrical sections adopted to fit over one of the tubes and into an annular space between the tubes. The semi-cylindrical sections each have an active end which is designed to engage against means connecting the tubes by slidably fitting through the annular slot between the tubes to thereby enable the tubes to be disconnected. The semi-cylindrical sections are located respectively on the end of a flexible, L-shaped arm which extends from a common tool handle.

Thus, it is an object of the invention to provide an improved tool for disconnecting a larger diameter tube from a second smaller diameter tube held together by a connect mechanism.

It is a further object of the invention to provide an improved tool for use with tubular couplings wherein the tool is comprised of semi-cylindrical sections which engage and decouple the tubes by movement along the axis of the tubes.

Yet a further object of the invention is to provide an inexpensive tool which may be used in combination with tubular couplings for decoupling tubes located and coupled in difficult to reach places.

Another object of the invention is to provide a tubular decoupling tool which is rugged, has a long life, is lightweight and is inexpensive.

These and other objects, advantages and features of the invention will be set forth in the detailed description which follows.

BRIEF DESCRIPTION OF THE DRAWING

In the detailed description which follows reference will be made to the drawing comprised of the following figures:

FIG. 2 is a cross-sectional view of the tubular decoupling tool of the present invention wherein the tool of the invention has been positioned to disengage tubes which are coupled;

FIG. 3 is a cross sectional view similar to FIG. 2 wherein the tool has been positioned over one tube;

FIG. 4 is a cross sectional view similar to FIG. 3 wherein the tool is moved axially to decouple the tubes;

DETAILED DESCRIPTION OF THE PREFERRED EMBODIMENT

Figure 5:
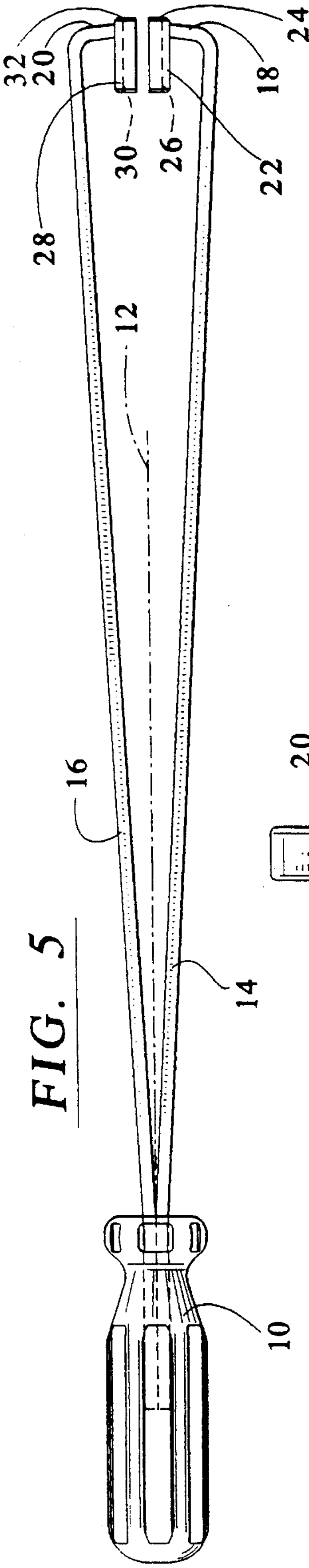
FIG. 5 is a plan view of an embodiment of the improved tool of the invention.
Figure 7:
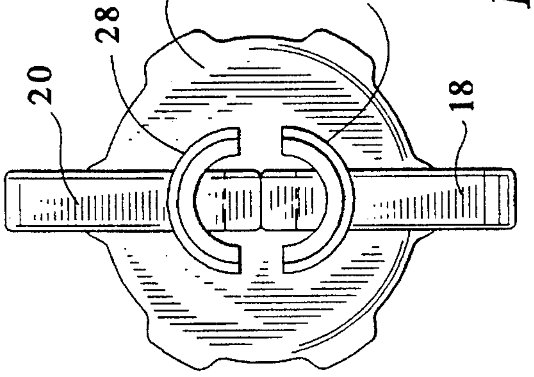
FIG. 7 is an end view of the tool of FIG. 5.
Figure 6:
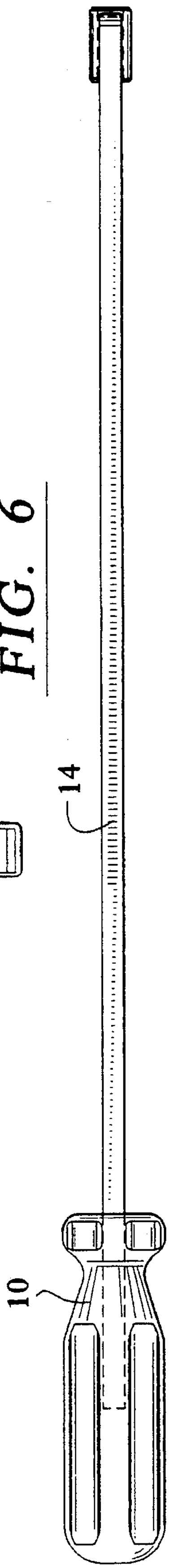
FIG. 6 is a side elevation of the tool of FIG. 5.

FIGS. 1 through 4 illustrate the method of operation of the tool of the invention. FIGS. 5, 6 and 7 illustrate the construction of the tool.

Referring to FIGS. 5, 6 and 7, the tool includes a handle 10 having a center line axis 12. The handle 10 may be manufactured from a molded plastic material and has the configuration of the typical screwdriver handle, for example. A first elongated steel spring arm 14 is molded into the handle 10 and extends from the end of the handle 10 outwardly, generally in the direction of the axis 12. Arm 14 also is spaced outwardly from the axis 12 at the distal end of arm 14.

A second elongated spring arm 16 also has one end molded into the handle 10, extends along the axis 12 and is spaced outwardly from the axis 12 at its distal end. The spring arms 14 and 16 spread from each other onto opposite sides of the axis 12 and thus are in a common plane and spaced approximately 180° apart. The spring arms 14 and 16 are elongated so that the active end of the tool (described below) can be positioned into highly inaccessible places.

Spring arm 14 terminates with a radially inwardly extending transverse arm 18. Spring arm 16 has a similar radially inwardly extending arm 20. The arms 18 and 20 lie generally along the same diameter through the axis 12.

A first generally semi-cylindrical member 22, having an outside end 24 and a working end 26, is welded to the transverse arm 18. The semi-cylindrical member 22 thus includes a working end 26 and opposite end 24 and is positioned so that the cylinder axis of the member 22 is generally coincident with the tool axis 12. A similarly sized and shaped second semi-cylindrical member 28 having a working end 30 and an opposite end 32 is attached or welded to the second transverse arm 20 in opposed relation to member 22. Note that the arm 18 is attached at the opposite end 24, and the arm 20 is attached at the opposite end 32 of the respective working members or semi-cylindrical members 22 and 28. The members 22 and 28 are of generally equal length and have a common cylindrical axis. The working ends 26, 30 are positioned inwardly along the axis 12 toward the handle 10. The working ends 26 and 30 are aligned and adapted to coact simultaneously with a coupling. The semi-cylindrical members 22 and 28 form a tubular shape having a typical diameter of one-quarter to three-quarters of an inch. The axial length of the flexible arms 14 and 16 may be somewhere in the vicinity of about three (3) or four (4) inches to about twenty (20) inches in length. A range of the relative ratio of the diameter of the semi-cylindrical members 22 and 28 to the length of the arms 14 and 16 is thus defined to be in the range of about 1 to 4 to about 1 to 80. The arms 14 and 16 are elastic beams and thus are flexible; however, they generally maintain members 27, 28 in opposed contact, but may be manually spread.

Figure 1:
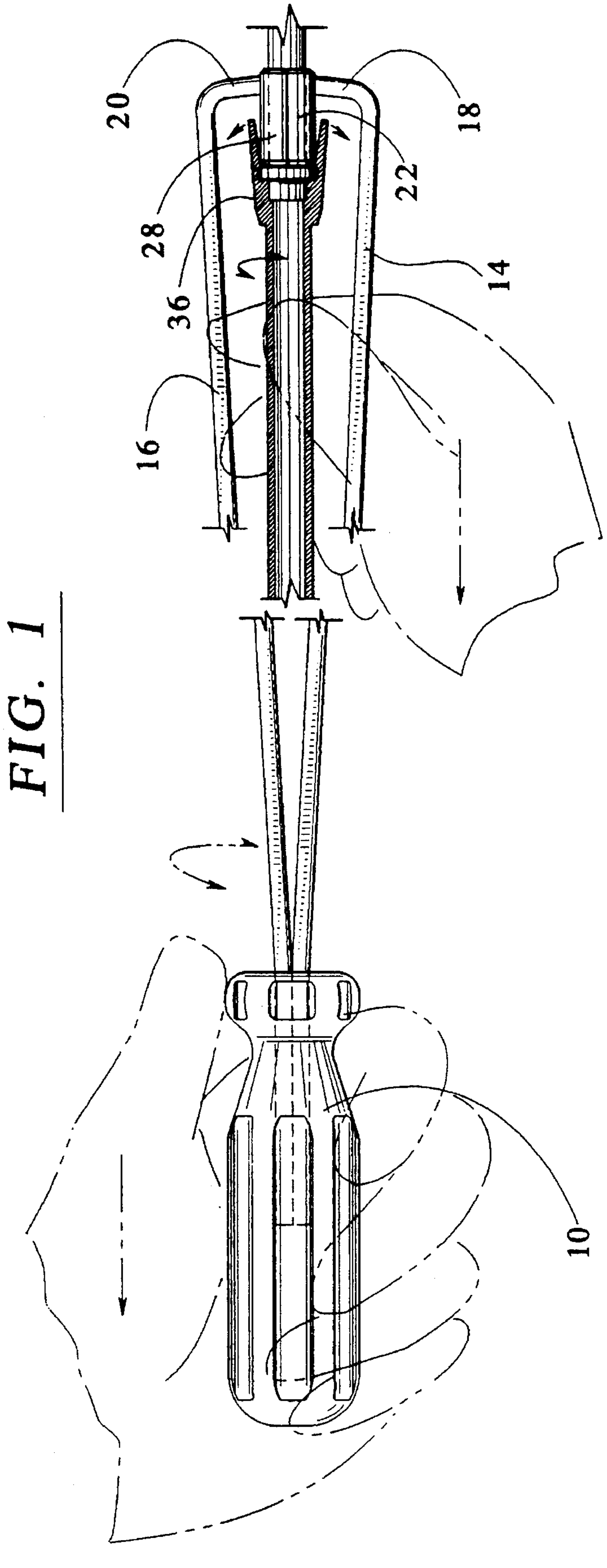
FIG. 1 is a isometric view illustrating a tubular coupling arrangement and further illustrating an embodiment of the improved tool of the invention.

FIGS. 1 through 4 illustrate the manner of operation of the tool of the invention. Referring first to FIGS. 1 and 2, there is depicted a typical coupling construction although the construction depicted is not a limitation of the methodology or utility of the tool of the invention. In any event, as depicted in FIGS. 1 and 2, a first smaller diameter tube 34 is joined to a larger diameter tubular section 36. The larger diameter tubular section 36 includes end flanges 38 which are flexible so that they may spread. The tube 34 coacting with the tube 36 defines an annular space 40 therebetween. A flexible annular ring 42 is maintained in a groove or is otherwise attached to the tube 34. The annular ring 42 fits within an inner peripheral groove 44 on the inside of the tubular member 36. In this manner, the tubes 34 and 36 are generally joined together. As shown in FIG. 2, the arms 14 and 16 may be manually spread to thereby spread the semi-cylindrical members 22 and 28 so that they may fit over the tube 34.

Next referring to FIG. 3, the biasing forces associated with the elongate arms 14 and 16 will cause those arms to flex to their original position in a manner that the semi-cylindrical members 22 and 28 will fit snugly against the tube 34. In this manner, the working end 30 and 26 of the semi-cylindrical members 34 and 22 may be positioned in the annular space 40 between tube 34 and tube 36.

Subsequently, as depicted in FIG. 4, the handle 10 may be moved axially and simultaneously twisted back and forth. This causes the semi-cylindrical members 22, 28 to move inwardly spreading the expandable flange portion 38 of tube 36. Thereby the tube 36 may be separated from the tube 34. Thus with the tool of the invention it is possible to position the semi-cylindrical members 22 and 28 in highly inaccessible positions, for example, underneath a fuel tank and in other inaccessible positions.

It is noted that in the disclosed tool the spring arms or elongated arms 14 and 16 extend longitudinally along axis 12. It is possible to provide a bend in those arms 14, 16 to thereby make a tool which will extend around corners or the like. However, the preferred embodiment of the invention is as depicted wherein the arms 14 and 16 are elongated and flexible so as to position the semi-cylindrical working members 22 and 28 into remote or very inaccessible positions. Thus while there has been set forth a preferred embodiment of the invention, it is to be understood that the invention is limited only by the following claims and equivalents thereof.

What is claimed is:

1. A tool for disconnecting coupled telescoping tubes of the type having a larger diameter tube fitted over a smaller diameter tube and further including a connecting member between the tubes; said assembly responsive to axial movement of a tool member into an annular space between the tubes to thereby cause disengagement and disconnection of the tubes, said tool comprising, in combination:

a first generally semi-cylindrical member;

a second generally semi-cylindrical member opposed to the first member and together forming a generally uniform diameter cylinder capable of fitting over and generally encircling one tube of the coupled tubes and capable of axial movement, when so positioned, axially into an annular space defined by the engaged, coupled tubes, each of said semi-cylindrical members having a working end and an opposite end, the working end being separated from the opposite end and adapted to project into the annular space between the tubes;

a handle having a center line axis;

a first elongated spring arm extending generally axially from the handle and outwardly from the centerline axis, said arm terminating in a transverse arm extending generally along a radius toward the axis and connected to the opposite end of the first semi-cylindrical member; and a second elongated spring arm extending generally axially from the handle on the opposite side of the axis from the first spring arm, in the same direction as the first spring arm and outwardly from the center line axis, said second arm also terminating in a transverse arm extending generally along a radius toward the axis and connected to the opposite end of the second semi-cylindrical member, whereby the working ends of the semi-cylindrical members are aligned to effect tube disengagement upon axial movement effected through the handle in the annular space.

2. The tool of claim 1 wherein the ratio of the length of the spring arms to the diameter of the semi-cylindrical members is in the range from about 4 to 1 to about 80 to 1.

* * * * *